US011716235B2

(12) United States Patent
Barrami

(10) Patent No.: US 11,716,235 B2
(45) Date of Patent: *Aug. 1, 2023

(54) REAL TIME OFDM TRANSMISSION SYSTEM

(71) Applicant: STMICROELECTRONICS SA, Montrouge (FR)

(72) Inventor: Fatima Barrami, Grenoble (FR)

(73) Assignee: STMICROELECTRONICS SA, Montrouge (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/722,048

(22) Filed: Apr. 15, 2022

(65) Prior Publication Data

US 2022/0239539 A1 Jul. 28, 2022

Related U.S. Application Data

(63) Continuation of application No. 14/505,052, filed on Oct. 2, 2014, now Pat. No. 11,336,496.

(51) Int. Cl.
*H04L 27/26* (2006.01)
*H04L 27/20* (2006.01)
*H04B 10/548* (2013.01)
*H04B 10/69* (2013.01)

(52) U.S. Cl.
CPC ....... *H04L 27/2628* (2013.01); *H04B 10/548* (2013.01); *H04B 10/69* (2013.01); *H04L 27/2096* (2013.01); *H04L 27/2697* (2013.01)

(58) Field of Classification Search
CPC .. H04B 10/548; H04B 10/69; H04B 27/2096; H04B 27/2628; H04B 27/2697
See application file for complete search history.

(56) References Cited

U.S. PATENT DOCUMENTS

| 6,266,687 | B1 | 7/2001 | Leyonhjelm et al. |
| 11,336,496 | B2* | 5/2022 | Barrami ........... H04B 10/69 |
| 2001/0030940 | A1 | 10/2001 | Hellberg |
| 2009/0161745 | A1 | 6/2009 | Pedersen et al. |
| 2009/0323510 | A1 | 12/2009 | Furrer et al. |
| 2010/0098042 | A1 | 4/2010 | Dent |
| 2011/0158361 | A1 | 6/2011 | Dent et al. |
| 2012/0076183 | A1 | 3/2012 | Dapper et al. |

(Continued)

FOREIGN PATENT DOCUMENTS

WO 2007064165 6/2007

OTHER PUBLICATIONS

Armstrong et al., "Power efficient Optical OFDM," *Electronics Letters* 42(6):370-372, Mar. 16, 2006.

(Continued)

*Primary Examiner* — David B Lugo
(74) *Attorney, Agent, or Firm* — Seed Intellectual Property Law Group LLP

(57) ABSTRACT

An OFDM (orthogonal frequency division multiplexing) transmitter includes an inverse fast Fourier transform circuit, which, in operation, generates, based on digital input data, a complex time-varying digital signal having real and imaginary components; and a multiplexer adapted to generate a time-multiplexed digital signal by time-multiplexing one or more of the real components with one or more of the imaginary components.

19 Claims, 2 Drawing Sheets

(56) References Cited

U.S. PATENT DOCUMENTS

2017/0070298 A1   3/2017   Elgala et al.

OTHER PUBLICATIONS

Barrami et al., "A novel FFT/IFFT size efficient technique to generate real time optical OFDM signals compatible with IM/DD systems," *Microwave Conference (EuMC), 2013 European*, Nuremberg, Oct. 6-10, 2013, pp. 1247-1250.

Fernando et al., "Flip-OFDM for Unipolar Communication Systems," *IEEE Transactions on Communications* 60(12):3726-3733, Dec. 2012.

Giacoumidis et al., "Adaptive Loading Algorithms for IMDD Optical OFDM PON Systems Using Directly Modulated Lasers," *J. Opt. Commun. Netw.* 4(10):769-778, Oct. 2012.

Moreolo et al., "Novel Power Efficient Optical OFDM Based on Hartley Transform for Intensity-Modulated Direct-Detection Systems," *Journal of Lightwave Technology* 28(5):798-805, Mar. 1, 2010.

Armstrong et al., "Comparison of Asymmetrically Clipped Optical OFDM and DC-Biased Optical OFDM in AWGN," *IEEE Communications Letters* 12(5):343-345, 2008.

Armstrong, "OFDM for Optical Communications," *Journal of Lightwave Technology* 27(3): 189-204, 2009.

Bouziane et al., "Dependence of Optical OFDM Transceiver ASIC Complexity on FFT Size," *National Fiber Optic Engineers Conference and Optical Fiber Communication Conference and Exposition*, Los Angeles, California, USA, Mar. 4-8, 2012, 3 pages.

Cooley et al., "An Algorithm for the Machine Calculation of Complex Fourier Series," *Mathematics of Computation* 19(90):297-301, 1965.

Elgala et al., "Practical Considerations for Indoor Wireless Optical System Implementation Using OFDM," *10th International Conference on Telecommunications*, Zagreb, Croatia, Jun. 8-10, 2009, pp. 25-29.

González et al., "Adaptive OFDM system for communications over the indoor wireless optical channel," *IEE Proc. Optoelectronics* 753(4): 139-144, 2006.

Kim et al., "Adaptive Clipping Technique for Reducing PAPR on OFDM Systems," *58th Vehicular Technology Conference*, Orlando, Florida, USA, Oct. 6-9, 2003, pp. 1478-1481.

Moreolo, "Power Efficient and Cost-Effective Solutions for Optical OFDM Systems Using Direct Detection," *12th International Conference on Transparent Optical Networks*, Munich, Germany, Jun. 27-Jul. 1, 2010, 4 pages.

Vanin, "Performance evaluation of intensity modulated optical OFDM system with digital baseband distortion," *Optics Express* 19(5):4280-4293, 2011.

Vetter, "Next Generation Optical Access Technologies," *38th European Conference and Exhibition on Optical Communications*, Amsterdam, Netherlands, Sep. 16-20, 2012, 42 pages.

\* cited by examiner

REAL TIME OFDM TRANSMISSION SYSTEM

BACKGROUND

Technical Field

The present disclosure relates to the field of circuits and methods for OFDM (orthogonal frequency division multiplexing) transmission and reception.

Description of the Related Art

Orthogonal frequency division multiplexing (OFDM) encoding is a method widely used in high data rate communications due to its robustness against inter-symbol interference (ISI). The encoding method generally uses, on the transmission side, the inverse fast Fourier transform (IFFT) to convert input data symbols into an OFDM signal, which can be transmitted over a transmission channel. On the receiver side, the fast Fourier transform (FFT) is used to convert back the OFDM signal into frequency components in order to recover the original data symbols.

One proposed application of OFDM encoding is for the transmission of data via an optical channel based on an intensity modulated and direct detection (IM/DD) system. According to an IM/DD system, the electrical signal to be transmitted is modulated onto the intensity of an optical transmitter.

A difficulty with using OFDM for IM/DD transmission is that OFDM signals are generally complex and bipolar, whereas the intensity modulation of an optical transmitter should generally be based on a real and positive signal. To overcome this difficulty, it has been proposed to constrain the frequency symbols provided to the IFFT component of the OFDM transmitter such that the Hermitian symmetry property is satisfied. However, this involves doubling the size of the IFTT and FFT components of the OFDM transmission system, leading to an increase in chip area and power consumption.

BRIEF SUMMARY

In an embodiment, an OFDM (orthogonal frequency division multiplexing) transmission circuit comprises: an inverse fast Fourier transform module for generating, based on digital input data, a complex time-varying digital signal having real and imaginary components; and a time-multiplexing module adapted to generate a time-multiplexed digital signal by time-multiplexing one or more of the real components with one or more of the imaginary components.

According to one embodiment, the inverse fast Fourier transform (IFFT) module is adapted to perform an N-point transform, where N is an integer equal to at least 3, to generate N parallel output values; and the OFDM transmission circuit further comprises a data mapping module adapted to generate N input values to the IFFT module based on an input data signal.

According to one embodiment, the time-multiplexing module is further adapted to perform serial conversion of the N parallel output values.

According to one embodiment, the OFDM transmission circuit further comprises: a digital to analog converter adapted to convert the time-multiplexed digital signal into a time-multiplexed analog signal; and an output module adapted to render positive the time-multiplexed analog signal to generate an OFDM output signal for transmission.

According to one embodiment, the output module is adapted to render positive the time-multiplexed analogue signal by flipping one or more negative values of the time-multiplexed analog signal to make them positive and time-multiplexing one or more positive values of the time-multiplexed analog signal with the one or more flipped values.

According to a further aspect, there is provided an optical transmitter comprising: the above OFDM transmission circuit; and a light source adapted to intensity modulate the OFDM output signal.

In an embodiment, an OFDM (orthogonal frequency division multiplexing) reception circuit comprises: a time-demultiplexing module adapted to demultiplex a time-multiplexed digital signal to extract one or more real components and one or more imaginary components and to combine the extracted real and imaginary components to generate a complex time-varying digital signal; a fast Fourier transform module adapted to process the complex time-varying signal to generate a plurality of frequency components representing transmitted data.

According to one embodiment, the time-demultiplexing module is further adapted to perform parallel conversion to generate N parallel output values based on the time-multiplexed digital signal, where N is an integer equal to at least 3; and the OFDM reception circuit further comprises a demapping module adapted to generate an output data signal based on the N parallel output values.

According to one embodiment, the fast Fourier transform module is adapted to perform an N-point transform to generate N frequency components representing the transmitted data.

According to one embodiment, the OFDM reception circuit further comprises an analog to digital converter adapted to perform analog to digital conversion on an analog OFDM signal to generate the time-multiplexed digital signal.

In an embodiment, an optical receiver comprises: an OFDM reception circuit; and a photosensor adapted to convert an optical signal into an analog OFDM signal.

In an embodiment, an optical data transmission system comprises: an optical transmitter; an optical receiver; and an optical transmission channel linking the optical transmitter and the optical receiver.

In an embodiment, a method of OFDM (orthogonal frequency division multiplexing) transmission comprises: generating, by an inverse fast Fourier transform module based on digital input data, a complex time-varying digital signal having real and imaginary components; and generating, by a time-multiplexing module, a time-multiplexed digital signal by time-multiplexing one or more of the real components with one or more of the imaginary components.

In an embodiment, a method of OFDM (orthogonal frequency division multiplexing) reception comprises: demultiplexing, by a time-demultiplexing module, a time-multiplexed digital signal ($y_{2N}(n)$) to extract one or more real components and one or more imaginary components; combining the extracted real and imaginary components to generate a complex time-varying digital signal; and processing, by a fast Fourier transform module, the complex time-varying digital signal to generate a plurality of frequency components representing transmitted data.

In an embodiment, a device comprises: an inverse fast Fourier transform (IFFT) circuit, which, in operation, generates a complex time-varying digital signal having real and imaginary components based on a digital input signal; and a multiplexer, which, in operation, time-multiplexes one or more of the real components of the complex time-varying digital signal with one or more of the imaginary components of the complex time-varying digital signal to generate a time-multiplexed digital signal. In an embodiment, the device comprises: data mapping circuitry, which, in operation, generates N input values based on the input data signal, wherein the IFFT circuit, in operation, performs an N-point transform on the N input values to generate N parallel output values, where N is an integer greater than or equal to three. In an embodiment, the multiplexer, in operation, converts N parallel output values into serial data of the time-multiplexed digital signal. In an embodiment, the device comprises: a digital to analog converter, which, in operation, converts the time-multiplexed digital signal into a time-multiplexed analog signal; and clipping circuitry, which, in operation, renders positive the time-multiplexed analog signal to generate an analog orthogonal frequency division multiplexing (OFDM) output signal for transmission. In an embodiment, wherein, in operation, the clipping circuitry flips one or more negative values of the time-multiplexed analog signal to make them positive and time-multiplexes one or more positive values of the time-multiplexed analog signal with the one or more flipped values.

In an embodiment, a device comprises: a demultiplexer, which, in operation, demultiplexes a time-multiplexed digital signal to extract one or more real components and one or more imaginary components and combines the extracted real and imaginary components to generate a complex time-varying digital signal; and a fast Fourier transform (FFT) circuit, which, in operation, generates a plurality of frequency components representing transmitted data based on the complex time-varying digital signal. In an embodiment, the demultiplexer, in operation, generates N parallel output values based on the time-multiplexed digital signal, where N is an integer equal to or greater than three, and the device comprises: demapping circuitry, which, in operation generates an output data signal based on the N parallel output values. In an embodiment, the FFT circuit, in operation, performs an N-point transform to generate N frequency components representing the transmitted data. In an embodiment, the device comprises an analog to digital converter, which, in operation, generates the time-multiplexed digital signal based on an analog orthogonal frequency division multiplexing (OFDM) signal. In an embodiment, the device comprises: a photosensor, which, in operation, converts an optical signal into the analog OFDM signal.

In an embodiment, a system comprises: an orthogonal frequency division multiplexing (OFDM) transmission circuit including: an inverse fast Fourier transform (IFFT) circuit configured to generate complex time-varying digital signals having real and imaginary components based on digital input signals; a multiplexer configured to time-multiplex one or more of real components with one or more of imaginary components of complex time-varying digital signals, generating time-multiplexed digital signals; a digital to analog converter configured to convert time-multiplexed digital signals into time-multiplexed analog signals; and clipping circuitry configured to generate clipped signals based on time-multiplexed analog signals; and an optical transmitter configured to intensity modulate signals generated by the clipping circuitry. In an embodiment, the output signals of the clipping circuitry are OFDM signals. In an embodiment, the OFDM transmission circuit comprises: data mapping circuitry configured to generate N input values based on an input data signal, wherein the IFFT circuit is configured to perform an N-point transform on the N input values to generate N parallel output values, where N is an integer greater than or equal to three. In an embodiment, the multiplexer is configured to convert N parallel output values into serial data of a time-multiplexed digital signal. In an embodiment, the system comprises: an optical receiver including: a photosensor configured to convert intensity modulated signals into time-multiplexed analog signals; an analog to digital converter configured to convert time-multiplexed analog signals into time-multiplexed digital signals; a demultiplexer configured to demultiplex time-multiplexed digital signals to extract real components and imaginary components and combine the extracted real and imaginary components to generate complex time-varying digital signals; and a fast Fourier transform (FFT) circuit configured to generate frequency components representing transmitted data based on complex time-varying digital signals. In an embodiment, the system comprises: an optical transmission channel configured to link the optical transmitter and optical receiver.

In an embodiment, a method comprises: generating using an inverse fast Fourier transform (IFFT) circuit, a complex time-varying digital signal having real and imaginary components based on digital input data; and generating, using a multiplexer, a time-multiplexed digital signal by time-multiplexing one or more of the real components with one or more of the imaginary components of the complex time-varying digital signal. In an embodiment, the method comprises: generating, using a data mapper, N input values based on an input data signal; and performing, using the IFFT circuit, an N-point transform on the N input values, generating N parallel output values, where N is an integer greater than or equal to three. In an embodiment, the method comprises: converting, using the multiplexer, the N parallel output values into serial data of the time-multiplexed digital signal. In an embodiment, the method comprises: converting the time-multiplexed digital signal into a time-multiplexed analog signal; and clipping the time-multiplexed analog signal.

In an embodiment, a method comprises: extracting, using a demultiplexer, one or more real components and one or more imaginary components of a time-multiplexed digital signal; combining, using the demultiplexer, the extracted real and imaginary components, generating a complex time-varying digital signal; and generating, using a fast Fourier transform (FFT) circuit, a plurality of frequency components representing data based on the complex time-varying digital signal. In an embodiment, the generating the plurality of frequency components includes generating N parallel output values, where N is an integer equal to or greater than three, and the method comprises: generating, using demapping circuitry, an output data signal based on the N parallel output values. In an embodiment, the method comprises performing, using the FFT circuit, an N-point transform to generate N frequency components representing the data.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

In the following description, numerous specific details are given to provide a thorough understanding of example embodiments. The embodiments can be practiced without one or more of the specific details, or with other methods, components, materials, etc. In other instances, well-known structures, materials, or operations, such as, for example, integrated circuits, shift registers, multiplexers, demultiplexers, optical transmitters, capacitors, diodes, drivers, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

While the embodiments described herein are directed to optical OFDM transmission, it will be apparent to those skilled in the art that the transmission and reception circuits described herein could have other applications. For example, the circuits described herein could advantageously be used in other types of unipolar communications systems, such as amplitude modulated RF wireless communications, and baseband digital communications over a single wire.

Figure 1:
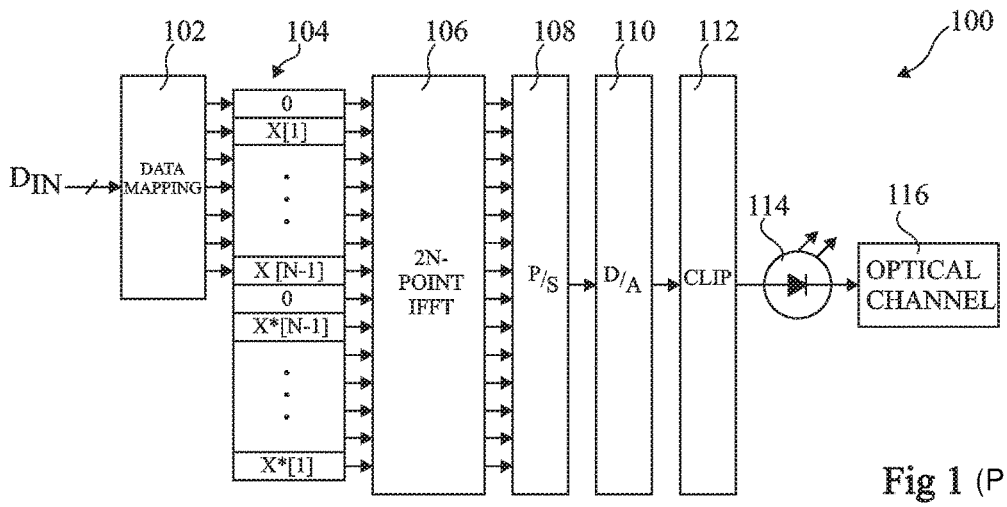
FIG. 1 schematically illustrates an OFDM transmission circuit according to an example embodiment.

FIG. 1 schematically illustrates an example of a transmission circuit 100 for transmitting an OFDM signal using the property of Hermitian symmetry.

A digital data input signal $D_{IN}$ is provided to a data mapping module (DATA MAPPING) 102, which applies a modulation scheme to the input data signal to generate N data symbols 0 to X[N−1], as represented by a block 104 in FIG. 1. The N data symbols are provided as input frequency symbols to a 2N-point inverse Fourier transform (IFFT) module (2N-POINT IFFT) 106. The data mapping module 102 also performs a complex conjugation of the symbols X[1] to X[N−1] to provide the symbols X*[N−1] to X*[1], which are also provided as inputs to the IFFT module 106. These 2N inputs to the IFFT module 106 respect the Hermitian symmetry property, and thus the 2N outputs of the IFFT module 106 will have only real components.

The transmission circuit 100 also includes a parallel to serial converter (P/S) 108 and a digital to analog converter (D/A) 110, which generate a time-varying analog signal based on the 2N output values of the IFFT module 106. This analog signal is likely to include negative portions, and thus a clipping module (CLIP) 112 is used to suppress these negative portions before the resulting OFDM signal is transmitted. The transmission is for example made using a light source 114, which is for example a LED (light emitting diode) or a VCSEL (vertical-cavity surface-emitting laser), and generates an intensity modulated optical signal to be transmitted over an optical channel (OPTICAL CHANNEL) 116.

A drawback of the transmission circuit of FIG. 1 is that respecting the Hermitian symmetry property requires that the IFFT performs a 2N-point transform for N input symbols. This doubles the size of the IFFT module. The reception side, not illustrated in FIG. 1, will also suffer a similar drawback.

Furthermore, it was shown in the publication entitled "Dependence of optical OFDM transceiver ASIC complexity on FFT size", R. Bouzine et al., National Fiber Optic Engineers Conference, 2012, that for large FFT sizes, a higher bit precision is required, leading to a high power consumption and/or a larger chip area.

Figure 2A:
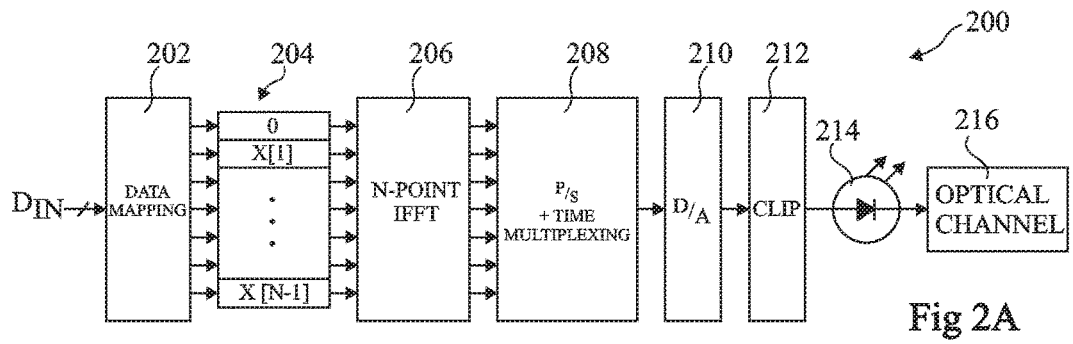
FIG. 2A schematically illustrates an OFDM transmission circuit according to an embodiment of the present disclosure.

FIG. 2A illustrates an OFDM transmission circuit 200 according to an example embodiment of the present disclosure.

As with the embodiment of FIG. 1, an input signal $D_{IN}$ is received by a data mapping module (DATA MAPPING) 202, which applies a modulation scheme to the input data to generate N input symbols 0 to X[N−1], represented by a block labelled 204 in FIG. 2A. N is for example an integer equal to 3 or more, and may for example be chosen to be a power of 2, for example 16, 32, 64, etc. The N data symbols are provided as frequency input symbols to an N-point inverse Fourier transform (IFFT) module (N-POINT IFFT) 206. Any of a broad range of modulation schemes could be applied by the modulation module 204, including one or more of: 4, 16, 32, 64, 128 or 256 QAM (quadrature amplitude modulation); PAM (pulse amplitude modulation); BPSK (binary phase shift keying); and QPSK (quadrature phase-shift keying). This list is not exhaustive, other modulation schemes being possible.

Unlike the example of FIG. 1, Hermitian symmetry is not used in the system of FIG. 2, and therefore an N-point, rather than a 2N-point, IFFT module 206 is used. The IFFT module 206 thus generates complex data values, each data value having real and imaginary components.

The N complex output values of the IFFT module 206 are provided to a parallel to serial converter and time multiplexing module (P/S+TIME MULTIPLEXING) 208. As will be described in more detail below, this module 208 for example performs time multiplexing of the real and imaginary components of the complex output values of the IFFT module 206, to generate a time-varying digital signal. This digital signal is provided to a digital to analog converter (D/A) 210, which converts the time-varying digital signal into a time-varying analogue signal. A clipping module (CLIP) 212 is then used to render the signal positive, and provide an OFDM signal for transmission over a transmission interface. In the example of FIG. 2A, the OFDM signal is used to intensity modulate a signal of an optical transmitter formed of a light source 214, which is for example a LED or a VCSEL. The optical signal is then transmitted via an optical channel (OPTICAL CHANNEL) 216. However, in alternative embodiments other types of transmission over other types of channels would be possible.

Figure 2B:
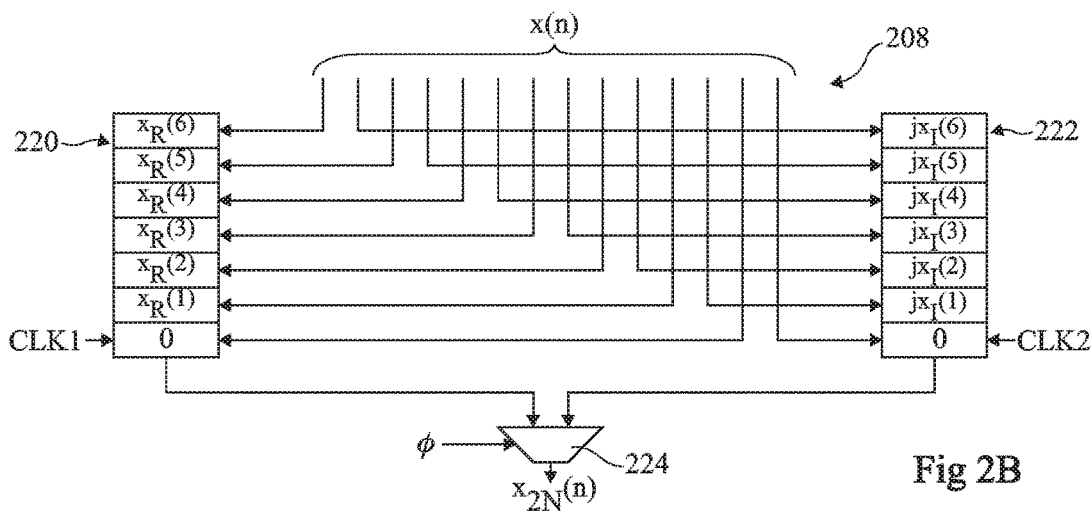
FIG. 2B schematically illustrates a parallel to serial and time-multiplexing module of FIG. 2A in more detail according to an example embodiment.

FIG. 2B schematically illustrates the parallel to serial converter and time multiplexing module 208 of FIG. 2A in more detail according to an example embodiment.

The module 208 receives a complex time-varying signal x(n) from the N-point IFFT module 206, with n in the range 1 to N. This signal can be formulated as follows:

$$x(n) = \sum_{k=0}^{N-1} (X_R(k) + jX_I(k))\exp\left(j2\pi\frac{kn}{N}\right)$$

where N a positive integer representing the number of points of the IFFT transform, and $x_R(k)$ and $X_I(k)$ are the real and imaginary components of the input values X(k) at the input of the IFFT module 206, which can be considered as representing a frequency vector. To avoid any DC shift, the DC component X(0) is set to zero. Thus the complex time-varying signal x(n) can be written as:

$$x(n) = x_R(n) + jx_I(n),$$

$$\text{for } n = 1, 2, \ldots, N - 1$$

where $x_R(n)$ and $jx_I(n)$ are respectively the real and the imaginary components of the signal x(n).

Time multiplexing the real and imaginary components of the signal x(n) involves alternating between the transmission of one or more real components and the transmission of one or more imaginary components. For this, the example implementation of FIG. 2B uses a pair of shift registers 220, 222. In this example, N is equal to 7, and there are thus 7 real components 0 and $x_R(1)$ to $x_R(6)$, and 7 imaginary components 0 and $jx_I(1)$ to $jx_I(6)$. The real components are loaded in parallel to corresponding cells of the shift register 220, and the imaginary components are loaded in parallel to corresponding cells of the shift register 222. A serial output of the shift register 220 is coupled to one input of a two-input multiplexer 224, and a serial output of the shift register 222 is coupled to the other input of the multiplexer 224. The serial outputs of the shift registers 220, 222 are clocked by timing signals CLK1 and CLK2 respectively. The multiplexer 224 is for example controlled by a phase signal φ.

In operation, after loading the real and imaginary components of the signal x(n) into the shift registers 220 and 222 respectively, the shift registers 220, 222 and multiplexer 224 are controlled to generate a time-multiplexed signal $x_{2N}(n)$ having values alternating between the real and imaginary components. In particular, while the phase signal φ has a first state, for example a logic "0", for selecting the output of the shift register 220, one or more of the real components are outputted from the shift register 220, for example by asserting rising edges of the clock signal CLK1. Then, while the phase signal φ has a second state, for example a logic "1", for selecting the output of the shift register 222, one or more of the imaginary components are outputted from the shift register 222, for example by asserting rising edges of the clock signal CLK2.

Figure 3:
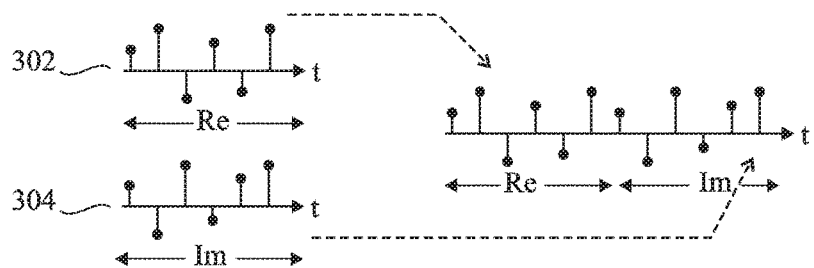
FIG. 3 is a timing diagram illustrating a time-multiplexing operation according to an example embodiment of the present disclosure.

FIG. 3 is a diagram representing the time multiplexing of the real and imaginary portions of the time signal according to one example embodiment. As illustrated, in this example the N real components (Re) 302 and the N imaginary components (Im) 304 of the complex time-varying signal x(n) are time-multiplexed such that the N real components are transmitted first, followed by the N imaginary components. In alternative embodiments, the real and imaginary components could be transmitted in many different ways. For example, they could be transmitted in a different order, the imaginary components being transmitted first. Additionally or alternatively, more or less than N real or imaginary components could be transmitted in series at a time.

Referring again to FIG. 2A, the clipping module 212 for example renders positive the analog time-varying signal from the digital to analog converter 210 by performing a DC-offset OFDM technique (DCO-OFDM) as described in the publication entitled "Adaptive Loading Algorithms for IMDD Optical OFDM PON Systems Using Directly Modulated Lasers", E. Giacoumidis et al., Journal of Optical Communications and Networking, Vol. 4, p. 769-778 (2012).

Alternatively, the clipping module 212 performs an asymmetrically clipped OFDM technique (ACO-OFDM) as described in the publication entitled "Power efficient optical OFDM", J. Armstrong and A. Lowery, Electron Lett., Vol. 42, no. 6, p. 370-372, March 2006.

As yet a further alternative, a technique of flipping to positive the negative portions of the signal could be used, as described in the PCT patent application WO2007/064165, and in the publication entitled "Flip-OFDM for Unipolar Communication Systems", Nirmal Fernando et al., IEEE Transactions and Communications, Vol. 60, No. 12, December 2012. This involves flipping one or more negative values of the time-multiplexed analog signal to make them positive and time-multiplexing one or more positive values of the time-multiplexed analog signal with the one or more flipped values.

For example, the signal $x_{2N}(n)$ generated by the module 208 and converted to an analog signal by the converter 210 can be considered as the sum of a positive part $x_{2N}^+(n)$ and a negative part $x_{2N}^-(n)$, where $x_{2N}^+(n)$ is equal to $x_{2N}(n)$ if x(n)≥0, and 0 otherwise, and $x_{2N}^-(n)$ is equal to $x_{2N}(n)$ if x(n)<0, and 0 otherwise. In order to convert the bipolar signal to a unipolar signal, the positive part and the flipped negative part are juxtaposed in the time domain as follows:

$$x_{4N}(n) = \begin{cases} x_{2N}^+(n), & n = 0, \ldots, 2N - 1 \\ -x_{2N}^-(n - N), & n = 2N, \ldots, 4N - 1 \end{cases}$$

Figure 4A:
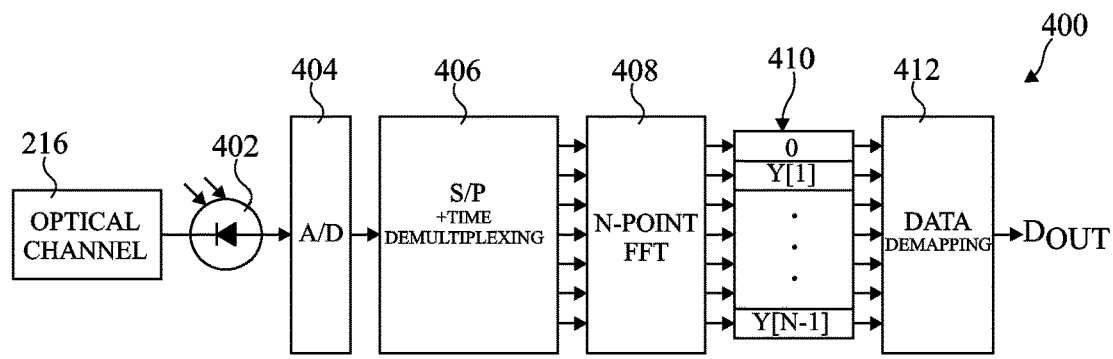
FIG. 4A schematically illustrates an OFDM reception circuit according to an example embodiment of the present disclosure.

FIG. 4A schematically illustrates a circuit 400 for receiving an OFDM signal having time-multiplexed real and imaginary components according to an example embodiment of the present disclosure. The OFDM signal is for example received via the optical channel (OPTICAL CHANNEL) 216 of FIG. 2A from the transmission circuit 200.

A photosensitive element 402, which is for example a photodiode, converts the optical OFDM signal into an analog electrical OFDM signal. The received signal will be the 2N-point unipolar signal $y_{2N}(n)$, except in the case that the clipping module 212 on the transmission side uses the flipping technique described above, in which case the received signal will be a 4N-point unipolar signal $y_{4N}(n)$. In such a case, this signal is for example first converted to a 2N-point bipolar signal as follows:

$$y_{2N}(n) = y_{4N}(n) - y_{4N}(2N + n), n = 0, \ldots, 2N - 1$$

The signal $y_{2N}(n)$ is provided to an analog to digital converter (A/D) 404. The A/D converter 404 converts the analog signal into a time-varying digital signal. This signal is provided to a serial to parallel converter and time demultiplexing module (S/P+TIME DEMULTIPLEXING) 406, which extracts the N real components $Y_R(n)$ and the N imaginary components $Y_I(n)$. These components are then provided to an N-point FFT module (N-POINT FFT) 408, which performs a fast Fourier transform to generate N frequency components 0 to Y[N−1], represented by a block 410 in FIG. 4A. The N frequency components are provided to a data demapping module (DATA DEMAPPING) 412, which generates the output data $D_{OUT}$ of the circuit based on the modulation scheme that was employed.

Figure 4B:
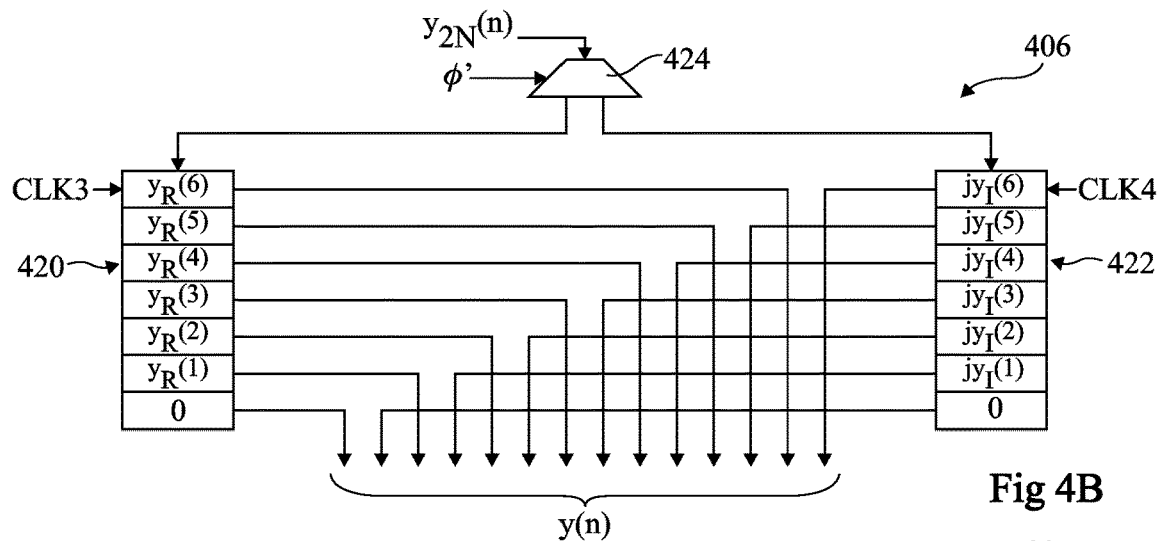
FIG. 4B schematically illustrates a serial to parallel converter and time-demultiplexing module of FIG. 4A in more detail according to an example embodiment.

FIG. 4B illustrates the serial to parallel converter and time demultiplexing module 406 in more detail according to an example embodiment. In the example of FIG. 4B, this module 406 is implemented by a pair of shift registers 420, 422 and a demultiplexer 424.

As illustrated, the frequency samples $y_{2N}(n)$ from the FFT 408 are provided to an input of the demultiplexer 424, which demultiplexes the signal based on a phase signal $\phi'$. One output of the demultiplexer 408 is coupled to a serial input of the shift register 422 clocked by a clock signal CLK3, and the other output of the demultiplexer 408 is coupled to a serial input of the shift register 424 clocked by a clock signal CLK4. The shift registers 420, 422 each comprise N cells that provide outputs in parallel forming the signal y(n).

In operation, the phase signal $\phi'$ has values causing the real components $y_R(1)$ to $y_R(6)$ to be directed by the demultiplexer 424 to the shift register 420 and the imaginary components $jy_I(1)$ to $jy_I(0)$ to be directed by the demultiplexer 424 to the shift register 422. The clock signals CLK3 and CLK4 then cause these real and imaginary components to be clocked one by one into the shift registers 420, 422 respectively.

Figure 5A:
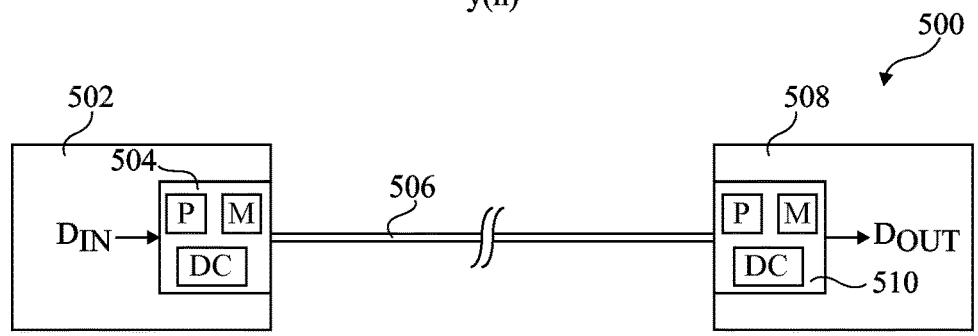
FIG. 5A schematically illustrates an optical transmission system according to an embodiment of the present disclosure.

FIG. 5A schematically illustrates an optical OFDM transmission system 500 according to an example embodiment. As illustrated, a transmitter 502 comprises a transmission circuit 504, which for example corresponds to the circuit 200 of FIG. 2A.

The optical channel 506 in the example of FIG. 5A is an optical waveguide 506, for example an optical fiber or the like. On the receiver side 508, a reception circuit 510 for example corresponds to the reception circuit 400 of FIG. 4A, providing output data $D_{OUT}$. As illustrated, the transmission circuit 504 comprises circuitry such as a processor P, a memory M and discrete circuitry DC, such as one or more capacitors, shift registers, multiplexers, D/A converters, IFFT circuits, etc., which may be used alone or in various combinations to implement various functionality of the transmission circuit 504. For example, the processor may execute instructions stored in the memory to facilitate data mapping, etc. As illustrated, the reception circuit 510 comprises circuitry such as a processor P, a memory M and discrete circuitry DC, such as one or more capacitors, shift registers, multiplexers, A/D converters, FFT circuits, etc., which may be used alone or in various combinations to implement various functionality of the reception circuit 510. For example, the processor may execute instructions stored in the memory to facilitate data demapping, etc.

Figure 5B:
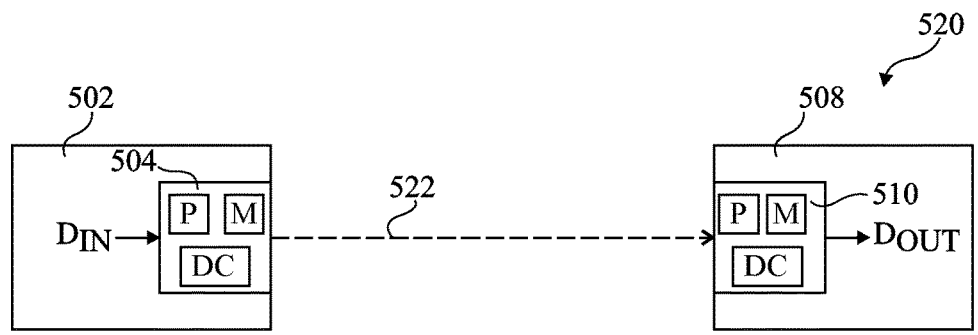
FIG. 5B schematically illustrates an optical transmission system according to an embodiment of the present disclosure.

FIG. 5B illustrates an alternative embodiment of an optical transmission system 520, which is identical to the system 500, except that rather than being implemented by an optical fiber 506, the optical channel between the transmission and reception sides 502, 508 is an air interface 522.

An embodiment facilitates generating a real and positive OFDM signal without the requirement of using a 2N-point IFFT module on the transmission side and a 2N-point FFT module on the reception side. This may lead to a high saving in chip area and energy consumption.

Having thus described at least one illustrative embodiment, various alterations, modifications and improvements will readily occur to those skilled in the art.

For example, it will be apparent to those skilled in the art that while a particular example of the modules forming the transmission and reception sides of an OFDM transmission system have been described, in alternative embodiments certain modules could be positioned in a different order and/or additional modules could be used. Furthermore, it will be apparent to those skilled in the art that the circuits of FIGS. 2B and 4B are merely examples, and that various different implementations would be possible.

Furthermore, it will be apparent to those skilled in the art that the various features of the embodiments described herein could be combined, in alternative embodiments, in any combination.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an analog to digital converter, which, in operation, generates a time-multiplexed digital signal based on a received unipolar analog signal;

a demultiplexer, which, in operation, demultiplexes the time-multiplexed digital signal to extract N real components and N imaginary components and combines the extracted real and imaginary components to generate a complex time-varying digital signal having N parallel output values, where N is an integer greater than or equal to 3 and the time-multiplexed digital signal has values alternating in time between a series of N real components and a series of N imaginary components;

a fast Fourier transform (FFT) circuit, which, in operation, performs an N-point transform on the N parallel output values to generate N asymmetrical symbols representing transmitted data based on the complex time-varying digital signal; and demapping circuitry, which, in operation, generates an output data signal based on the N asymmetrical symbols.

2. The device of claim 1, wherein the unipolar analog signal is an analog orthogonal frequency division multiplexed (OFDM) signal.

3. The device of claim 2, comprising:
a photosensor coupled to the analog to digital converter, wherein the photosensor, in operation, converts a received optical signal into the analog OFDM signal.

4. The device of claim 1, comprising:
a photosensor, which, in operation, converts an optical signal into the analog unipolar signal.

5. A non-transitory computer-readable medium having contents that cause a receiver to perform a method, the method comprising:
generating a time-multiplexed digital signal based on a unipolar analog signal;
extracting N real components and N imaginary components of the time-multiplexed digital signal, where N is an integer greater than or equal to three and the time-multiplexed digital signal has values alternating in time between a series of N real components and a series of N imaginary components;
combining the extracted real and imaginary components, generating a complex time-varying digital signal having N parallel output values;
performing an N-point transform on the N parallel output values to generate N asymmetrical symbols representing data based on the complex time-varying digital signal; and
generating an output data signal based on the N asymmetrical symbols.

6. The non-transitory computer-readable medium of claim 5, wherein the unipolar analog signal is an analog orthogonal frequency division multiplexed (OFDM) signal.

7. The non-transitory computer-readable medium of claim 5, wherein the method comprises converting an optical signal into the unipolar analog signal.

8. The non-transitory computer-readable medium of claim 7, wherein the method comprises generating optical signals.

9. The non-transitory computer-readable medium of claim 5 wherein the contents comprise instructions executed by signal processing circuitry of the receiver.

10. A device, comprising:
a memory; and
signal processing circuitry coupled to the memory, wherein the signal processing circuitry, in operation:
generates a time-multiplexed digital signal based on a unipolar analog signal;
extracts N real components and N imaginary components of the time-multiplexed digital signal, where N is an integer greater than or equal to three and the time-multiplexed digital signal has values alternating in time between a series of N real components and a series of N imaginary components;
combines the extracted real and imaginary components, generating a complex time-varying digital signal having N parallel output values;
performs an N-point transform on the N parallel output values to generate N asymmetrical symbols representing data based on the complex time-varying digital signal; and
generates an output data signal based on the N asymmetrical symbols.

11. The device of claim 10, comprising:
a photosensor coupled to the signal processing circuitry, wherein the photosensor, in operation, converts an optical signal into the analog unipolar signal.

12. The device of claim 10, wherein the unipolar analog signal is an analog orthogonal frequency division multiplexed (OFDM) signal.

13. The device of claim 10, comprising an integrated circuit including the memory and the signal processing circuitry.

14. A system, comprising:
a sensor, which, in operation, converts intensity modulated signals into analog unipolar signals; and
signal processing circuitry coupled to the sensor, wherein the signal processing circuitry, in operation:
generates a time-multiplexed digital signal based on a unipolar analog signal;
extracts N real components and N imaginary components of the time-multiplexed digital signal, where N is an integer greater than or equal to three and the time-multiplexed digital signal has values alternating in time between a series of N real components and a series of N imaginary components;
combines the extracted real and imaginary components, generating a complex time-varying digital signal having N parallel output values;
performs an N-point transform on the N parallel output values to generate N asymmetrical symbols representing data based on the complex time-varying digital signal; and
generates an output data signal based on the N asymmetrical symbols.

15. The system of claim 14, comprising:
a receiver including the sensor and the signal processing circuitry; and
a transmitter, which, in operation, transmits intensity modulated signals.

16. The system of claim 15, wherein the transmitter, in operation:
generates N input symbols from a digital input signal, without imposing symmetry conditions on the generated N input symbols;
performs an N-point transform on the N input symbols to generate a complex time-varying digital signal having real and imaginary components;
time-multiplexes N of the real components with N of the imaginary components of the complex time-varying digital signal, generating a time-multiplexed digital signal having values alternating in time between a series of N real components and a series of N imaginary components;
converts the time-multiplexed digital signal into a time-multiplexed analog signal;

renders positive the time-multiplexed analog signal to generate a unipolar analog signal; and transmits an intensity modulated signal based on the unipolar analog signal.

17. The system of claim 16 wherein the transmitter, in operation, transmits the intensity modulated signal to the receiver.

18. The system of claim 17, wherein the sensor is a photosensor and the intensity modulated signal is an optical signal.

19. The system of claim 18, comprising:

an optical transmission channel coupled between the transmitter and the receiver.

\* \* \* \* \*

UNITED STATES PATENT AND TRADEMARK OFFICE
CERTIFICATE OF CORRECTION

PATENT NO. : 11,716,235 B2
APPLICATION NO. : 17/722048
DATED : August 1, 2023
INVENTOR(S) : Fatima Barrami It is certified that error appears in the above-identified patent and that said Letters Patent is hereby corrected as shown below:

On the Title Page

Page 2, Item (56) References Cited/Other Publications:
"González et al., "Adaptive OFDM system for communications over the indoor wireless optical channel," IEE Proc. Optoelectronics 753(4):139-144, 2006"
Should read:
--González et al., "Adaptive OFDM system for communications over the indoor wireless optical channel," IEE Proc. Optoelectronics 153(4):139-144, 2006--

Signed and Sealed this
Twelfth Day of September, 2023

Katherine Kelly Vidal
*Director of the United States Patent and Trademark Office*